United States Patent
Duff et al.

(10) Patent No.: US 10,589,825 B2
(45) Date of Patent: Mar. 17, 2020

(54) ANCHOR ADAPTOR

(71) Applicant: CMP GROUP LTD., Vancouver (CA)

(72) Inventors: Michael A. Duff, North Vancouver (CA); Mark Pocock, Vancouver (CA)

(73) Assignee: CMP GROUP LTD., Vancouver (CA)

( * ) Notice: Subject to any disclaimer, the term of this patent is extended or adjusted under 35 U.S.C. 154(b) by 4 days.

(21) Appl. No.: 15/771,620

(22) PCT Filed: Oct. 30, 2015

(86) PCT No.: PCT/IB2015/058381
§ 371 (c)(1),
(2) Date: Apr. 27, 2018

(87) PCT Pub. No.: WO2017/072558
PCT Pub. Date: May 4, 2017

(65) Prior Publication Data
US 2018/0319462 A1  Nov. 8, 2018

(51) Int. Cl.
| | | |
|---|---|---|
| *B63B 21/46* | (2006.01) | |
| *B63B 21/42* | (2006.01) | |
| *B63B 21/38* | (2006.01) | |
| *F16G 15/08* | (2006.01) | |

(52) U.S. Cl.
CPC .......... *B63B 21/46* (2013.01); *B63B 21/38* (2013.01); *B63B 21/42* (2013.01); *F16G 15/08* (2013.01)

(58) Field of Classification Search
CPC ......... F16G 15/06; F16G 15/08; B63B 21/22; B63B 21/24; B63B 21/46; B63B 2021/505
See application file for complete search history.

(56) References Cited

U.S. PATENT DOCUMENTS

| | | |
|---|---|---|
| 2,203,390 A | 6/1940 | Maxwell |
| 2,476,348 A | 7/1949 | Alvik et al. |
| 3,368,513 A | 2/1968 | Dove |
| 3,675,608 A | 7/1972 | Webb |
| 6,009,826 A * | 1/2000 | Nole .................. B63B 21/46 114/297 |

FOREIGN PATENT DOCUMENTS

WO    WO-2012143897 A1    10/2012

OTHER PUBLICATIONS

International Search Report and Written Opinion of the International Searching Authority for International Application No. PCT/IB2015/058381, dated Jul. 7, 2016.
Active Rotation Anchor Fittings Innovation (2007-G-196479), Boyut Makina Sanayi Ve Ticaret Ltd. Co., Oct. 4, 2007.

\* cited by examiner

*Primary Examiner* — Andrew Polay
(74) *Attorney, Agent, or Firm* — Marshall, Gerstein & Borun LLP

(57) ABSTRACT

An adaptor for an anchor including a first member configured for coupling a chain and a hollow second member for pivotally coupling an anchor. The second member defines a longitudinally extending blind slot on an inner surface and a longitudinally extending opening diametrically opposite the blind slot. The blind slot configured to restrict pivoting motion of the anchor within the second member and a swivel coupler for coupling the first member to the second member.

14 Claims, 7 Drawing Sheets

ANCHOR ADAPTOR

CROSS-REFERENCE TO RELATED APPLICATIONS

This is the United States national phase of International Patent Application No. PCT/IB2015/058381, filed Oct. 30, 2015, the entire contents of which are incorporated herein by reference.

TECHNICAL FIELD

Present disclosure relates to an adaptor for an anchor. In particular the present disclosure relates to an adaptor for an anchor that provides a swivel coupling.

BACKGROUND

Anchors are used to moor a marine vessel, for example a yacht or a boat, at a place by engaging the anchor with a stationary object or a ground surface or an ocean floor. The anchors are generally coupled with a chain to the vessel and kept on the vessel. When the vessel has to be anchored, the anchor is released in the water to lower towards the ground surface under their own weight, and engage the ground surface or ocean floor to moor the vessel.

When the vessel is to be moved, the anchor is retracted by pulling the chain coupled to the anchor. The anchor is generally retracted by pulling the chain over a guiding surface, for example rollers. After the chain is completely retracted, the anchor coupled to the chain is also pulled over the roller to store it on the vessel.

Anchors generally have a shank and a fluke portion. The flukes are coupled to one end of the shank. After the chain is completely retracted, the shank portion of the anchor is pulled over a guiding surface on the vessel. During pulling the anchor over the guiding surface, the anchor may be required to align in a particular position for effective retraction and storage of the anchor on the vessel. Any misalignment may result in improper retraction of the anchor, for example, the fluke portion may get stuck on the guiding surface or any other proximal component and hamper any further movement of the anchor. Thus, there may be instances when the anchor may be required to be aligned manually for proper retraction of the anchor.

Turkish Patent Document No. 2007-G-196479, provides for an anchor connecting device that provides for self-alignment of the anchor during retraction of the anchor. The document provides for a balance fork and an obstructive device on the ball socket to effect automatic alignment of the anchor.

SUMMARY OF THE INVENTION

The present disclosure provides for an adaptor for an anchor including a first member configured for coupling a chain and a hollow second member for pivotally coupling an anchor. The second member defines a longitudinally extending blind slot on an inner surface and a longitudinally extending opening diametrically opposite the blind slot. The blind slot is configured to restrict pivoting motion of the anchor within the second member. The present disclosure further provides for a swivel coupler for coupling the first member to the second member.

The present disclosure provides for an anchor assembly including a chain, a first member for coupled to the chain, an anchor and a hollow second member for pivotally coupling the anchor. The second member defines a longitudinally extending blind slot on an inner surface and a longitudinally extending opening diametrically opposite the blind slot. The blind slot is configured to restrict pivoting motion of the anchor within the second member. The present disclosure further provides for a swivel coupler for coupling the first member to the second member.

DETAILED DESCRIPTION

Figure 1:
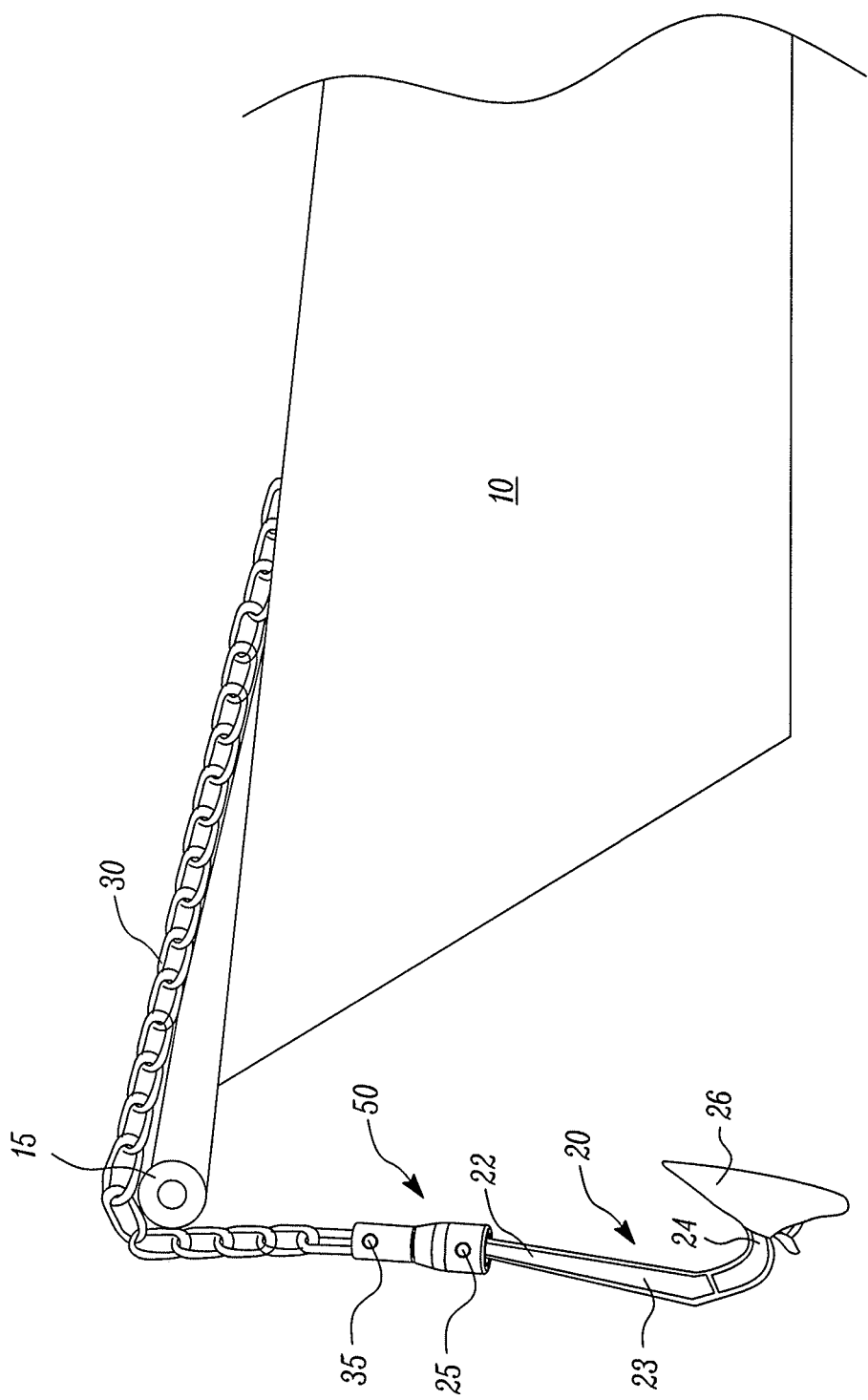
FIG. 1 illustrates a marine vessel.

FIG. 1 illustrates a boat 10 having an anchor 20 coupled to the boat 10 using a chain 30. The boat 10 may be any marine vessel that may have an anchor 20. The anchor 20 may be released or retracted by releasing or pulling the chain 30 over a roller 15. In the embodiment illustrated a roller 15 is shown as guiding surface. In an alternate embodiment, any guiding surface suitable for the purpose may be used.

The anchor 20 may be coupled to the chain 30 using an adaptor 50. The anchor may have a shank 23 with an adaptor end 22 and a fluke end 24. The adaptor end 22 may be coupled to the adaptor 50 using an anchor pin 25. The fluke end 24 may have flukes 26 for engaging a ground surface or an ocean floor. The flukes may extend from the fluke end 24 in a direction away from a longitudinal axis 21 of the shank 23.

Figure 2:
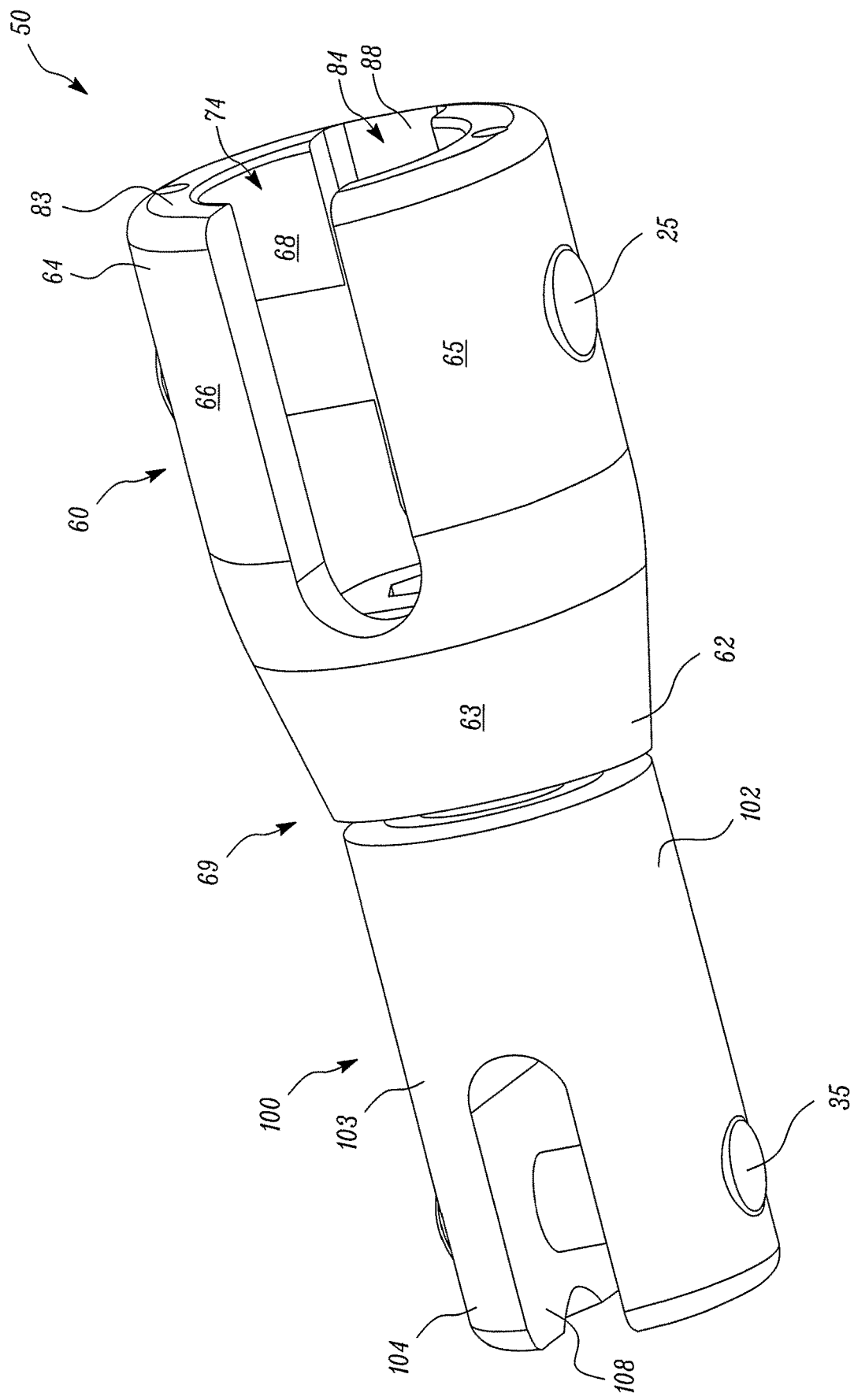
FIG. 2 illustrates a perspective view of an adaptor in accordance with an embodiment.
Figure 3:
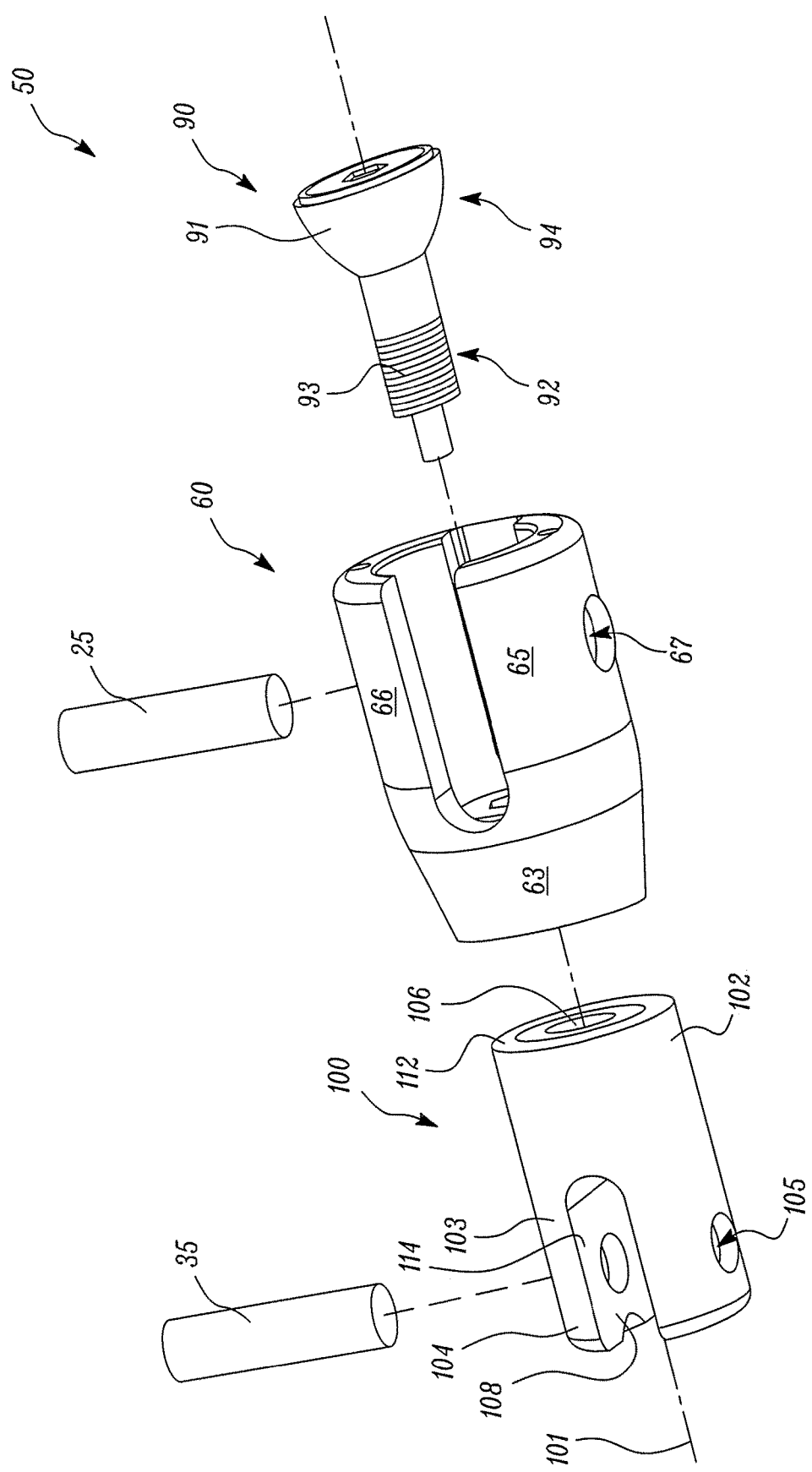
FIG. 3 illustrates an exploded view of the adaptor in accordance with an embodiment.
Figure 4:
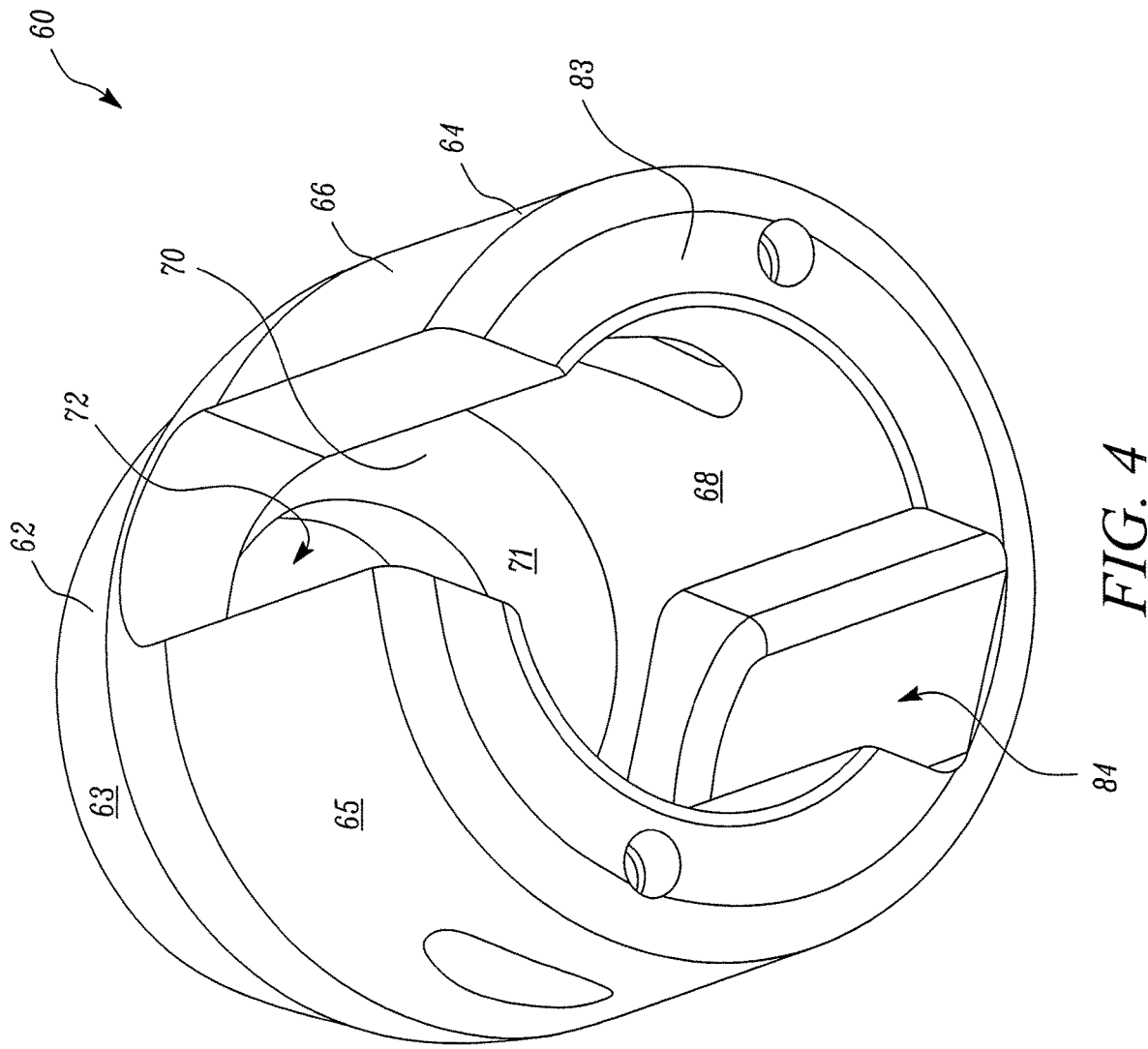
FIG. 4 illustrates a bottom perspective view of the anchor in accordance with an embodiment.
Figure 5:
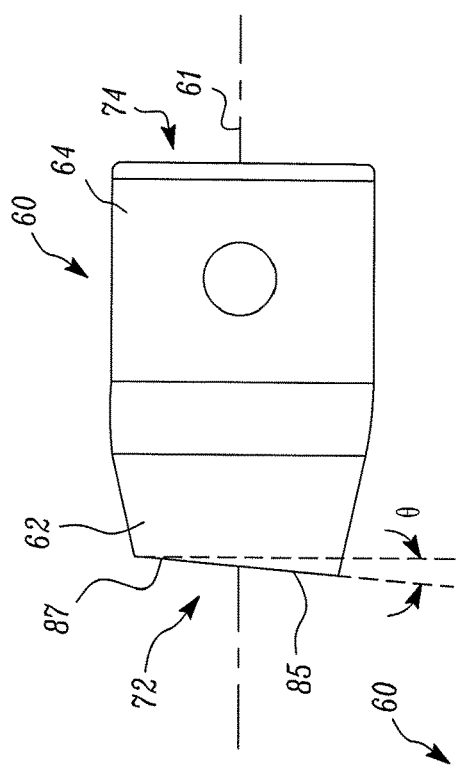
FIG. 5 illustrates side view of the adaptor in accordance with an embodiment.
Figure 6:
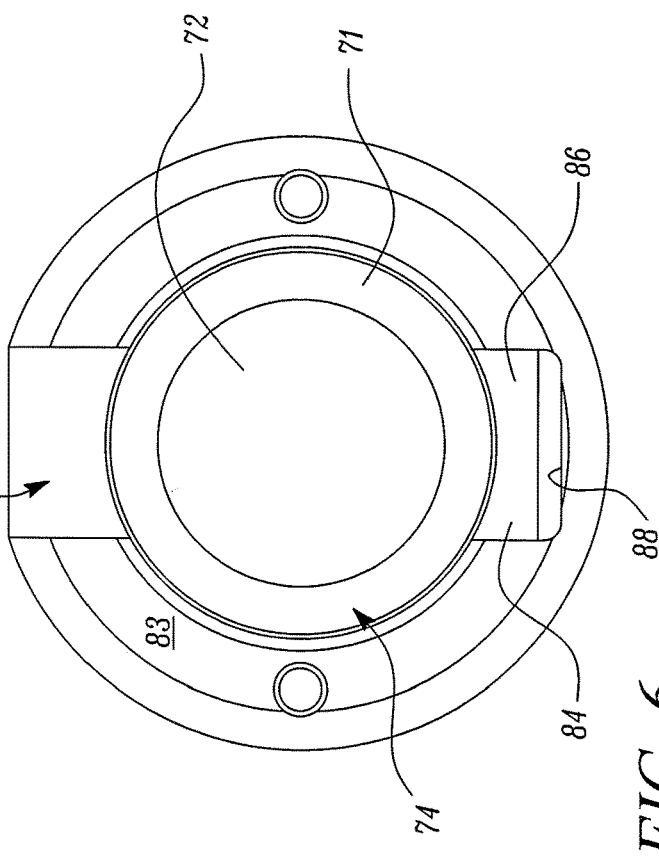
FIG. 6 illustrates bottom view of the adaptor in accordance with an embodiment.
Figure 7:
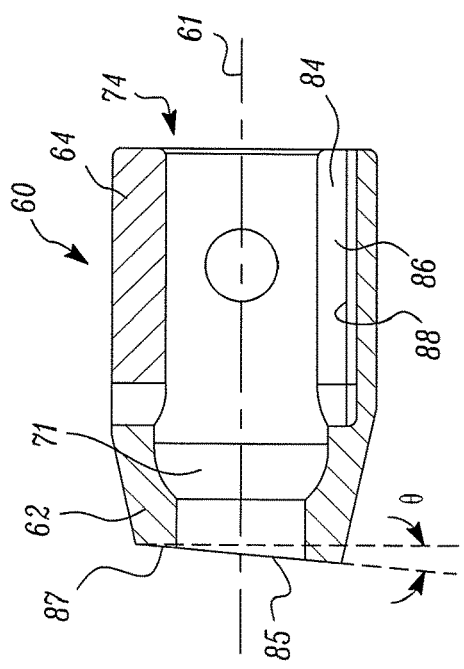
FIG. 7 illustrates cross-section view of the adaptor in accordance with an embodiment.

As illustrated in FIG. 2 and FIG. 3, the adaptor 50 may include a knuckle 60 a ball swivel 90 and chain clevis 100. The components of the adaptor may be made of any suitable material, for example metal. In an embodiment, different components of the adaptor may be made of different materials. For example, one or all of the components may be made of plastic.

Referring to FIG. 3-7, the knuckle 60 may be substantially of a hollow cylindrical shape. The knuckle 60 may have a first end 62, a second end 64, an outer surface 66, an inner surface 68. The outer surface 66 may have a frusto-conical surface 63 at the first end 62 and a straight surface 65 at the second end 64. The knuckle 60 may further define a top opening 72 and a bottom opening 74. The bottom opening 74 may be adapted for receiving the adaptor end 22 of the anchor 20. The adaptor end 22 of the anchor 20 may be pivotally coupled to the knuckle using an anchor pin 25. The knuckle 60 may have two anchor pin openings 67 on the inner surface 68 for receiving and holding the anchor pin 25. The longitudinal axis of the anchor pin 25 may be oriented perpendicular to the longitudinal axis 61 of the knuckle 60. Further, the knuckle 60 at the first end 62 may define a ball socket 70 on the inner surface 68. The ball socket 70 may have a spherical concave surface 71 defined on the inner surface 68 proximate to the first end 62 of the knuckle 60.

The knuckle 60 may further have a top surface 81 and a bottom surface 83. The top surface 81 may be oriented on a plane angularly disposed with respect to the longitudinal axis 61 of the knuckle 60, such that the inclined top surface 81 may have raised portion 85 and a lower portion 87. The top surface 81 may be inclined at an angle θ to a plane perpendicular to the longitudinal axis 61 of the knuckle 60.

Further, the knuckle 60 may define a slot 82 extending through the inner surface 68 to the outer surface 66 in width, and from the bottom surface 83 along length of the straight surface 65 of the knuckle 60. The slot 82 may be designed and positioned on the knuckle 60 for receiving the shank 23 of the anchor 20 during pivoting the of the shank 23 about the anchor pin 25. The slot 82 may allow pivoting of the anchor 20 in one direction. The inclined top surface 81 is oriented with respect to the position of the blind slot 84 and the slot 82 such that the lower portion 87 of the top surface 81 is proximate to the blind slot 84 and the raised portion 85 of the top surface 81 is proximate to the slot 82.

Further, the knuckle 60 may have a blind slot 84 positioned diametrically opposite to the slot 82. The blind slot 84 may be a recess 86 defined on the inner surface 68. The recess 86 may extend from the bottom surface 83 along the length of the straight surface 65. The recess 86 may be designed to partly receive the anchor shank 23. The blind slot 84 may be designed to block the pivoting motion of the anchor shank 23 about the anchor pin 25 in a second direction. The recess may have a blocking surface 88 that may block the pivotal movement of the shank 23 in the second direction.

The ball swivel 90 may have a threaded end 92 and a ball end 94. The threaded end 92 may have threads 93 for coupling with the chain clevis 100. The ball swivel 90 may further have a convex spherical surface 91 for bearing the concave spherical surface 71 of the knuckle 60. The threaded end 92 of the ball swivel 90 may be designed to be received in the top opening 72 of the knuckle 60, and the ball end 94 may be designed to bear the concave spherical surface 71 of the knuckle. The convex spherical surface 91 may be designed to movably abut the concave spherical surface 71. This may provide for a ball and socket joint 69 or a swivel coupling for facilitating a pivotal and rotational movement of the knuckle 60 relative to the ball swivel 90. In the embodiment as illustrated, the knuckle 60 and the chain clevis 100 are coupled using a ball swivel 90. In an alternate embodiment, the knuckle 60 and the chain clevis may be coupled using any swivel coupling known in the art. In an embodiment, the knuckle 60 may include a portion that bears a portion of the chain clevis to provide for a swivel coupling between the chain clevis 100 and the knuckle 60.

The chain clevis may be substantially cylindrical and hollow in shape. The chain clevis 100 may have a threaded end 102 and a chain end 104. The threaded end 102 may have a threaded opening 106 for engaging the threads 93 on the threaded end 92 of the ball swivel 90. The ball swivel 90 may be rigidly coupled to the chain clevis 100 using the threads 93. Further, the chain end 104 may have a chain opening 108 for receiving the chain 30. In the embodiment as illustrated, threads 93 formed on the threaded end 92 are used for coupling the ball swivel 90 to the chain clevis 100. In an alternate embodiment, any know arrangement may be used to rigidly couple the ball swivel 90 to the chain clevis 100.

Further, the chain clevis 100 may have an end surface 112 on the threaded end 102. The end surface 112 may be on a plane perpendicular to the longitudinal axis 101 of the chain clevis 100. Further, the chain clevis may define two diametrically opposite chain pin openings 105 for receiving a chain pin 35. The chain pin 35 may couple the chain 30 to the chain end 104 of the chain clevis 100. Further, the chain clevis 100 may define two diametrically opposite chain slots 114 extending in length from the chain end 104 up to a middle portion 103 of the chain clevis 100.

Figure 8:
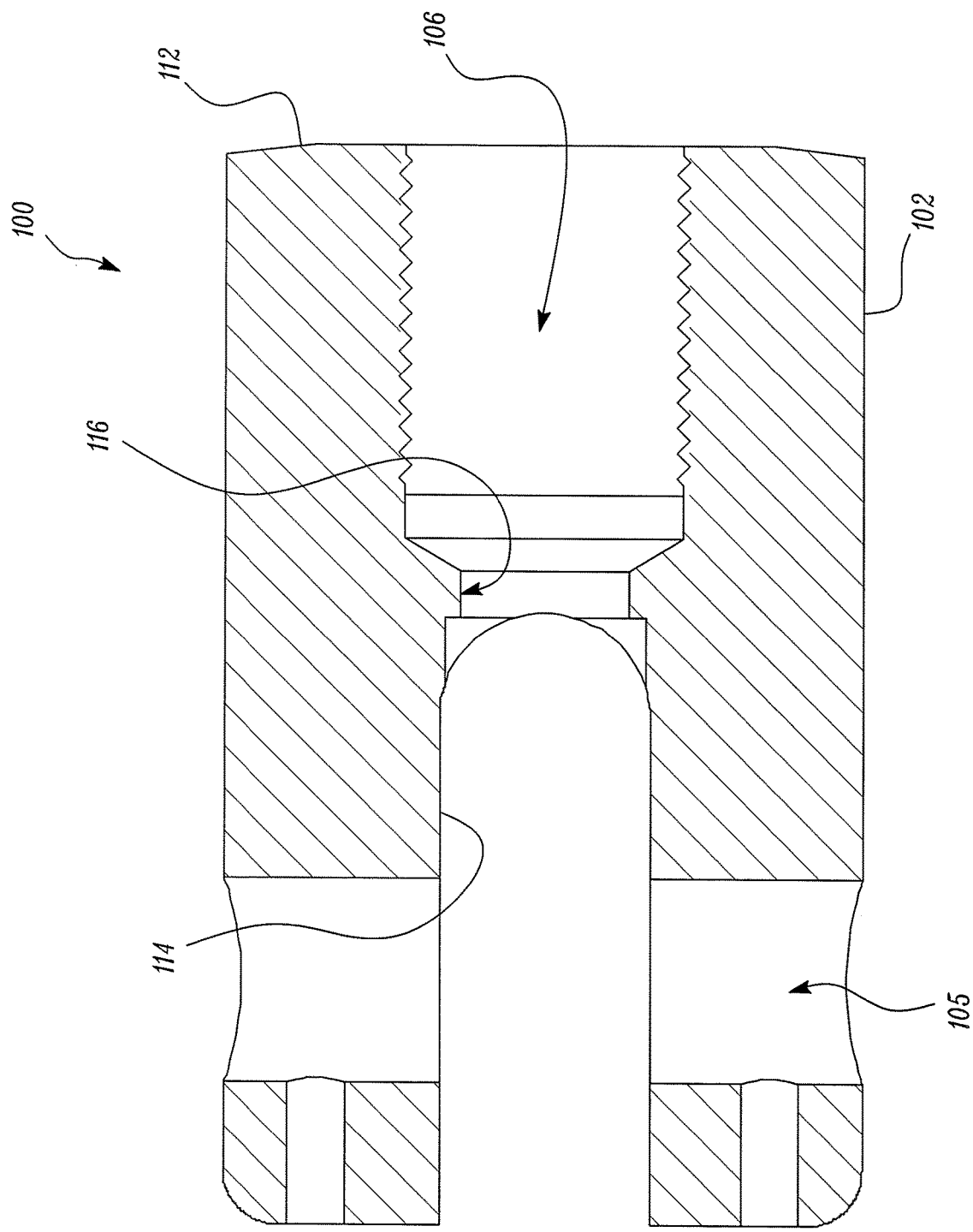
FIG. 8 illustrates a cross-section side view of a spigot opening receiving a hollow swage spigot in accordance with an embodiment.
Figure 9:
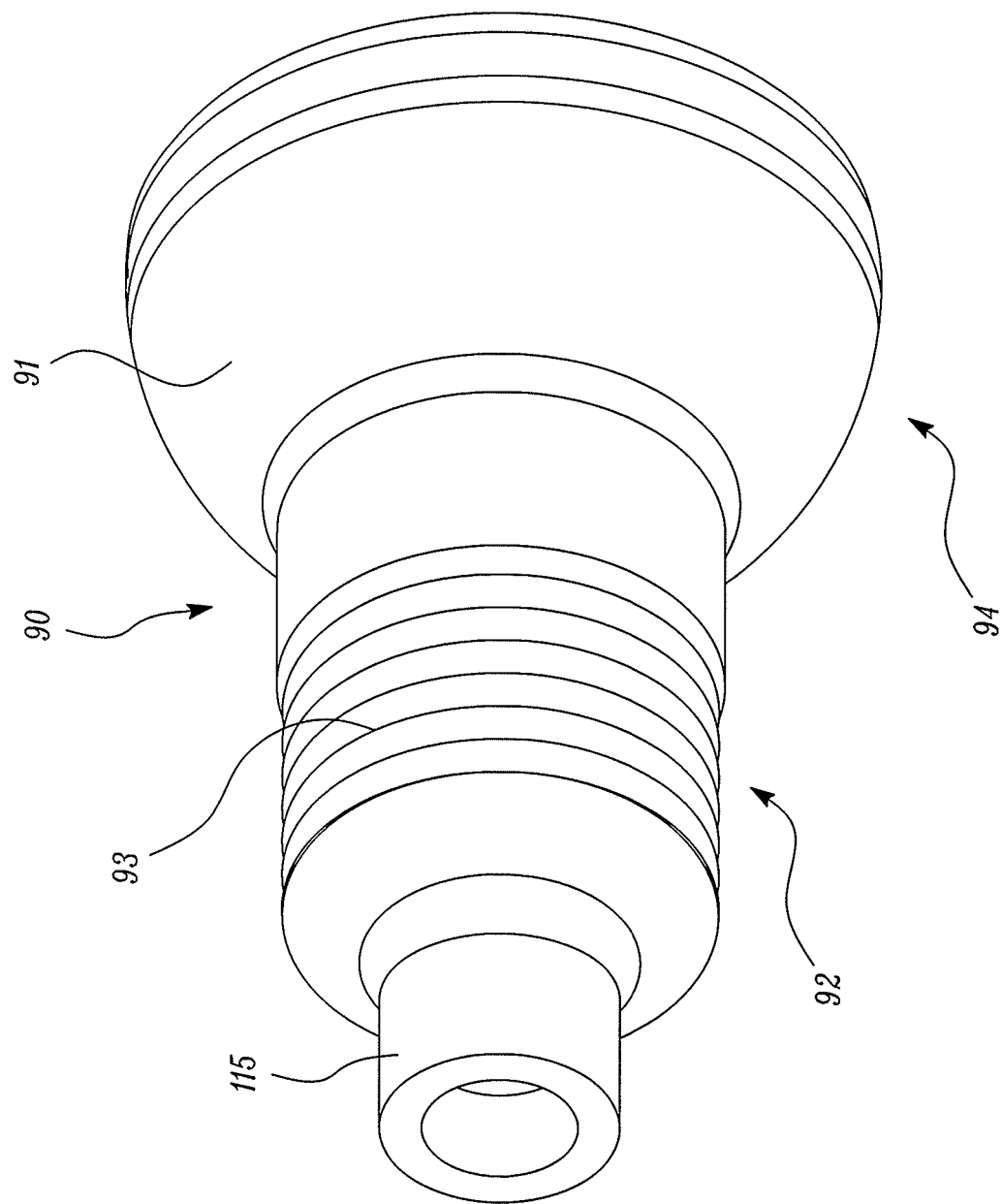
FIG. 9 illustrates a perspective view of a chain ball swivel with the hollow swage spigot in accordance with an embodiment.

As illustrated in FIG. 2, in an assembled state of the adaptor 50, the ball swivel 90 couples the chain clevis 100 to the knuckle 60 such that the knuckle 60 may move pivotally and rotationally relative to the chain clevis 100. As illustrated in FIG. 9, the chain ball swivel 90 may include a hollow swage spigot 115. The hollow swage spigot 115 may be received in an spigot opening 116 illustrated in FIG. 8. During assembly, after the hollow swage spigot 115 is received in the spigot opening 116, the hollow swage spigot 115 may be deformed or swaged using a tool, for example a press, such that the ball swivel 90 may be permanently retained with the chain clevis 100.

The chain clevis Further, the adaptor end 22 of the anchor 20 may be coupled to the knuckle 60 such that the flukes 20 point towards the slot 82 of the knuckle 60. Further, in the assembled state of the adaptor 50, the end surface 112 of the chain clevis 100 may face the top surface 81 of the knuckle 60.

When the anchor 20 is retracted by pulling the chain 30 over the roller 15 the chain passes of the roller 15 followed by the adaptor 50 and then the shank 23. For proper retraction of the anchor 20 the flukes 26 may be desired to be oriented towards the boat 10. However, while chain is being retracted, the anchor 20 along with the adaptor 50 may suspend from an end of the chain with the fluke 26 oriented towards any other direction away from the boat 10. In such instance, during retraction when the adaptor 50 passes over the roller 15, the adaptor 50 may tend to partially raise the fluke end 26 of the anchor 20 due to pulling of the chain 30 over the roller 15. When the anchor is reaches a non-vertical position with the flukes 26 pointed away from the boat 10, the weight of the flukes 26 may impart a turning moment in the shank 23 of the anchor 20. The inclined top surface 81 in conjunction with the ball and socket joint 69 between the ball swivel 90 and the knuckle 60 may facilitate turning of the shank 23 relative to the chain clevis 100. The shank 23 may turn under the force of gravity until the flukes 26 are directed towards the boat 10. This way the anchor 20 automatically aligns in a desired position under force of gravity.

INDUSTRIAL APPLICABILITY

The anchors 20 are widely used for mooring a boat 10 in the ocean. The anchors 20 may need to be released or retracted from the boat for mooring the boat. During retraction of the anchor from the ocean floor, the anchor 20 may or may not align in a desirable position for proper retraction and storage of the anchor over the boat. Present disclosure provides for a self-aligning adaptor for coupling an anchor to a chain such that the anchor 20 may self-align under its own weight during retraction.

The present disclosure provides for an adaptor having an inclined top surface 81 on a knuckle 60 that operates with the end surface 112 of the chain clevis 100, which in conjunction with a rotational coupling of the chain clevis with respect to the knuckle 60 facilitates self-alignment of the anchor 20 under its own weight in a desired position.

The desirable alignment of the anchor 20 after the retraction may also facilitate easy releasing of the anchor in the ocean for an effortless mooring of the boat 10. The present disclosure thus eliminates the need for manually aligning the anchor 20 during retraction of the anchor 20.

LIST OF ELEMENTS

Boat 10
Roller 15
Anchor 20
Adaptor end 22
Shank 23
Fluke end 24
Anchor pin 25
Flukes 26
Chain 30
Chain pin 35
Adaptor 50
Knuckle 60
Longitudinal axis (of the knuckle) 61
First end 62
Frusto-conical surface 63
Second end 64
Straight surface 65
Outer surface 66
Anchor pin openings 67
Inner surface 68
Ball and socket joint 69
Ball socket 70
Concave spherical surface 71
Top opening 72
Bottom opening 74
Slot 82
Top surface 81
Slot 82
Bottom surface 83
Blind slot 84
Raised portion 85
Recess 86
Lower portion 87
Blocking surface 88
Ball swivel 90
Convex spherical surface 91
Threaded end 92
Threads 93
Ball end 94
Chain clevis 100
Longitudinal axis (of the chain clevis) 101
Threaded end 102
Middle portion 103
Chain end 104
Chain pin openings 105
Threaded opening 106
Chain opening 108
End surface 112
Chain slots 114
Hollow Swage Spigot 115
Spigot opening 116

What is claimed is:

1. An adaptor for an anchor comprising:
a chain clevis configured for coupling a chain;
a hollow second member for pivotally coupling an anchor, the second member defining a longitudinally extending blind slot on an inner surface and a longitudinally extending opening diametrically opposite the blind slot, the blind slot configured to restrict pivoting motion of the anchor within the second member; and
a swivel coupler for coupling the chain clevis to the second member, wherein the swivel coupler has a ball end for coupling the second member and a threaded end for coupling the chain clevis.

2. The adaptor of claim 1, wherein the second member comprises a top surface inclined to a plane perpendicular to a longitudinal axis of the second member.

3. The adaptor of claim 1, wherein the chain clevis comprises an end surface perpendicular to a longitudinal axis of the chain clevis.

4. The adaptor of claim 1, wherein the swivel coupler comprises a swage spigot configured to be received in an opening in the chain clevis, the swage spigot configured to be deformed for rigidly coupling the swivel coupler to the chain clevis.

5. The adaptor of claim 1, wherein an inner surface of the second member is concave.

6. The adaptor of claim 1, wherein the second member includes a knuckle defining a cylindrical shape and having two openings for receiving and holding an anchor pin, the anchor being pivotally coupled to the knuckle using the anchor pin.

7. The adaptor of claim 1, wherein the chain clevis defines a cylindrical and hollow shape defining two diametrically opposite openings for receiving a chain pin, the chain pin configured for coupling the chain.

8. An anchor assembly comprising:
a chain;
a chain clevis coupled to the chain;
an anchor;
a hollow second member for pivotally coupling the anchor, the second member defining a longitudinally extending blind slot on an inner surface and a longitudinally extending opening diametrically opposite the blind slot, the blind slot configured to restrict pivoting motion of the anchor within the second member; and
a swivel coupler for coupling the chain clevis to the second member, wherein the swivel coupler has a ball end for coupling the second member and a threaded end for coupling the chain clevis.

9. The anchor assembly of claim 8, wherein the second member comprises a top surface inclined to a plane perpendicular to a longitudinal axis of the second member.

10. The anchor assembly of claim 8, wherein the chain clevis comprises an end surface perpendicular to a longitudinal axis of the chain clevis.

11. The anchor assembly of claim 8, wherein an inner surface of the second member is concave.

12. The anchor assembly of claim 8, wherein the second member includes a knuckle defining a cylindrical shape and having two openings for receiving and holding an anchor pin, the anchor being pivotally coupled to the knuckle using the anchor pin.

13. The anchor assembly of claim 8, wherein the chain clevis defines a cylindrical and hollow shape defining two diametrically opposite openings for receiving a chain pin, the chain pin configured for coupling the chain.

14. The anchor assembly of claim 8, wherein the swivel coupler comprises a swage spigot configured to be received in an opening in the chain clevis, the swage spigot configured to be deformed for rigidly coupling the swivel coupler to the chain clevis.

\* \* \* \* \*